US011061370B2

(12) United States Patent
Coni et al.

(10) Patent No.: US 11,061,370 B2
(45) Date of Patent: Jul. 13, 2021

(54) VIEWING SYSTEM INCLUDING A HOLOGRAPHIC OPTICAL DEVICE ALLOWING IMAGES TO BE DISPLAYED IN DIFFERENT PLANES

(71) Applicant: THALES, Courbevoie (FR)

(72) Inventors: Philippe Coni, Saint Jean D'Illac (FR); Jean-Luc Bardon, Martignas Sur Jalle (FR); Bernard Dubourg, Merignac (FR)

(73) Assignee: THALES, Courbevoie (FR)

( * ) Notice: Subject to any disclaimer, the term of this patent is extended or adjusted under 35 U.S.C. 154(b) by 417 days.

(21) Appl. No.: 16/047,785

(22) Filed: Jul. 27, 2018

(65) Prior Publication Data

US 2019/0033783 A1 Jan. 31, 2019

(30) Foreign Application Priority Data

Jul. 31, 2017 (FR) ...................................... 1700806

(51) Int. Cl.
*G03H 1/22* (2006.01)
*G02B 27/09* (2006.01)
(Continued)

(52) U.S. Cl.
CPC ....... *G03H 1/2249* (2013.01); *G02B 27/0103* (2013.01); *G02B 27/0977* (2013.01);
(Continued)

(58) Field of Classification Search
None
See application file for complete search history.

(56) References Cited

U.S. PATENT DOCUMENTS 5,305,124 A * 4/1994 Chern .................. G02B 17/023
359/13
10,747,000 B2 * 8/2020 Alexander ........... G03H 1/0248
(Continued)

FOREIGN PATENT DOCUMENTS

EP 0 290 333 A1 11/1988
FR 3 026 197 A1 3/2016
(Continued)

OTHER PUBLICATIONS

Liu, et al., "A Multi-Plane Volumetric Optical See-Through Head Mounted 3D Display", published in SID, Issue 1, San Francisco, CA, May 22-May 27, 2016.
(Continued)

*Primary Examiner* — Derek S. Chapel
(74) *Attorney, Agent, or Firm* — BakerHostetler

(57) ABSTRACT

Viewing systems are provided which include a screen and an optical collimation device including two holographic optical elements working by reflection, the first holographic optical element being closer to the screen, the second holographic optical element being closer to an observer. In the system, the screen displays a first object at a first wavelength and a second object at a second wavelength. Each holographic optical element includes two holographic treatments, each treatment being able to reflect one of the two wavelengths and to transmit the other wavelength. The first holographic element and the second holographic element are arranged such that the image of the first object forms at a first distance from the screen and that the image of the second object forms at a second distance from the screen, different from the first distance.

14 Claims, 2 Drawing Sheets

(51) Int. Cl.
G02B 27/30 (2006.01)
G02B 27/01 (2006.01)
G03H 1/02 (2006.01)

(52) U.S. Cl.
CPC ...... *G02B 27/30* (2013.01); *G02B 2027/0107* (2013.01); *G02B 2027/0127* (2013.01); *G03H 2001/0216* (2013.01)

(56) References Cited

U.S. PATENT DOCUMENTS

| | | | |
|---|---|---|---|
| 2006/0001977 A1* | 1/2006 | Shimizu | G02B 27/0103 359/630 |
| 2012/0086993 A1 | 4/2012 | Hayashida et al. | |
| 2013/0065159 A1 | 3/2013 | Bjelkhagen et al. | |
| 2016/0187666 A1* | 6/2016 | Manns | G02B 27/017 359/479 |

FOREIGN PATENT DOCUMENTS

| | | |
|---|---|---|
| FR | 3 028 051 A1 | 5/2016 |
| WO | 2011/144939 A2 | 11/2011 |

OTHER PUBLICATIONS

Kogelnik, "Coupled Wave Theory for Thick Hologram Gratings", The Bell System Technical Journal, vol. 48, No. 9, pp. 2909-2947, Nov. 1969.

Coni, et al., "A Full Windshield Head-Up Display Using Simulated Collimation", SID Symposium Digest of Technical Papers, vol. 47, No. 1, pp. 684-687, May 2016.

* cited by examiner

VIEWING SYSTEM INCLUDING A HOLOGRAPHIC OPTICAL DEVICE ALLOWING IMAGES TO BE DISPLAYED IN DIFFERENT PLANES

CROSS-REFERENCE TO RELATED APPLICATIONS

This application claims priority to foreign French patent application No. FR 1700806, filed on Jul. 31, 2017, the disclosure of which is incorporated by reference in its entirety.

FIELD OF THE INVENTION

The field of the invention is that of viewing systems allowing an image to be projected at a certain distance from an observer in a manner superimposed on the external landscape. These systems are used notably in aircraft cockpits to give the pilot information regarding piloting or navigation. Other applications are possible, notably in the field of motor vehicle transport.

BACKGROUND

There are viewing systems called 'head-up displays' that allow a collimated image to be projected at 'infinity' in a manner superimposed on the external landscape. Object at 'infinity' is understood to mean an object that is at a distance large enough that the light rays coming from a point of the object are perceived as being parallel to one another when viewed by the observer.

These devices allow virtual objects to be displayed in what is termed a 'congruent' position, that is to say that their images are perfectly superimposed at the locations that actual objects occupy externally. Thus, the image of a synthetic runway is displayed in a manner perfectly superimposed at the exact location that the actual runway occupies on the ground. The same is true, for example, for the horizon line.

However, the pilot requires information that is not congruent and that is not displayed by 'head-up displays'. Currently, this information is presented on viewing devices installed on the instrument panel. This presentation has two drawbacks. The pilot mandatorily has to divert his view from the outside in order to view said information. Moreover, there is a mandatory accommodation time between changing from the outside view to the observation of the instrument panel, which is situated less than a metre from the pilot's view.

To rectify these drawbacks, it has been proposed to create transparent viewing screens that are able to be integrated into the windscreen of the aircraft. The problem of superimposition onto the outside is thus solved. However, the image is mandatorily located on the screen. It is therefore not congruent and it is not at infinity. The accommodation problems are therefore not solved.

To mitigate these various problems, it is possible to use posture detection for the head of the user associated with a stereoscopic system. Posture detection makes it possible to control the position of the projected images such that, when the user moves his head, the projected image is still seen in the same direction. It is thus perceived as congruent.

The stereoscopic system makes it possible to send, to each eye, the left-hand and right-hand images corresponding to a pseudo-distance from an object, independent of the actual distance from the stereoscopic screen to the observer. The vergence problems are thus solved. However, the left-hand and right-hand images are still situated on the screen. The accommodation problems are not solved. In fact, distortion is introduced between the vergence information and the accommodation information. Moreover, stereoscopic systems require the use of glasses for differentiating between the left-hand and right-hand images, thereby possibly leading to other problems, notably in terms of ergonomics. Mention will be made, as exemplary embodiment of this type of system, of patent FR 14 02109 entitled 'Monochrome stereoscopic viewing system with projection on semi-transparent slide'.

Another approach consists in periodically projecting images that are situated at different distances from the observer. To perform this function, the initial object is generated in different planes by way of optical diffusers or 'shutters' that may be made transparent or opaque. The publication by Shuxin Liu et al entitled 'A multi-plane volumetric optical see-through head mounted 3D display' published in SID, Issue 1, San Francisco, Calif., 22 May-27 May 2016 proposes a solution of this type in which the viewing system is mounted on a headset. It is understood that adapting to larger embedded viewing devices poses complex implementation problems.

Studies performed based on images projected at a finite distance show that, if it is desired to simultaneously view, in stereoscopic vision, aerial images that are congruent at infinity and images that are non-congruent at a certain distance under reasonable viewing comfort conditions, that is to say without loss of visual acuity and without significant ocular fatigue, it is only necessary for the minimum distance of the non-congruent images not to be less than around 1.7 metres. With regard to this point, reference will be made to the publication entitled 'A full Windshield Head-Up display using Simulated Collimation' by Philippe Coni et al, SID 2016 DIGEST, pages 684-687.

Holographic optical elements are optical components obtained by recording an interference phenomenon between two waves in a photosensitive material, the interference bringing about optical index variations inside the material, which variations are retained when the hologram is then developed. These elements are said to be a volume phase hologram in so far as the photosensitive material has to have a certain thickness in order to allow a significant number of interference fringes to be recorded and also in so far as the index variations lead only to phase variations in the incident light waves, without an amplitude variation. These elements may work by reflection or by transmission.

These holographic elements have a certain number of noteworthy properties. Specifically, it is possible to obtain a wide variety of optical functions by varying the form of the recording waves. These functions are in part independent of the form of the carrier of the holographic optical element. Thus, a holographic optical element recorded on a flat carrier may have optical power and have a function comparable to that of a prism, of a lens or of a mirror.

Lastly, these holographic elements have, by nature, spectral selectivity. For a given incidence, the holographic component reflects light in a given spectral band and is transparent outside of this spectral band, the spectral band depending on the recording wavelength and, more generally, the recording conditions. Reference will be made to the seminal article by H. Kogelnik entitled 'Coupled Wave Theory for thick Hologram Gratings', The Bell System Technical Journal, Vol. 48, November 1969, No. 9 for all information regarding the diffractive operation of this type of hologram.

It is also possible to record holograms having different optical functions at different wavelengths in one and the same photosensitive carrier. Reference will be made to the publication US 2012/0086993 entitled 'Photopolymer medium for color hologram recording and color hologram image recording method' for additional information regarding this point. Publication US 2013/0065159 entitled 'Color holographic optical element' will also be cited regarding this subject. The only constraint is that the output spectral bands have to be separate enough to avoid any 'crosstalk' phenomenon.

SUMMARY OF THE INVENTION

The viewing system according to the invention utilizes these various properties of holographic optical elements. It includes a collimation device including two holographic optical elements making it possible to superimpose, on the outside, two images of different colours at two different distances. More precisely, one subject of the invention is a viewing system including a screen and an optical collimation device forming the image from this screen at a first distance from said screen, said optical device including two holographic optical elements working by reflection, the first holographic optical element being closer to the screen, the second holographic optical element being closer to an observer, characterized in that:

the screen displaying a first object at a first wavelength and a second object at a second wavelength, the first wavelength being different from the second wavelength;

the first holographic optical element includes a first holographic treatment having a first optical power reflecting the first wavelength and transmitting the second wavelength;

the first holographic optical element includes a second holographic treatment having a second optical power reflecting the second wavelength and transmitting the first wavelength;

the second holographic optical element includes a third holographic treatment having a third optical power reflecting the first wavelength and transmitting the second wavelength;

the second holographic optical element includes a fourth holographic treatment having a fourth optical power reflecting the second wavelength and transmitting the first wavelength;

the first holographic element and the second holographic element being arranged such that the image of the first object at the first wavelength forms at a first distance from the screen and that the image of the second object at the second wavelength forms at a second distance from the screen, substantially different from the first distance.

Advantageously, the first object is emitted in a first narrow spectral band centred on the first wavelength, the second object is emitted in a second narrow spectral band centred on the second wavelength, the first spectral band being separate from the second spectral band, each band having a spectral width of between 10 nanometres and 20 nanometres.

Advantageously, the first wavelength and the second wavelength have close colorimetries.

Advantageously, the first wavelength and the second wavelength have different colorimetries.

Advantageously, the first wavelength is situated in the green and the second wavelength in the red.

Advantageously, the screen displays the first object at a third wavelength different from the first wavelength and from the second wavelength, the first holographic treatment and the third holographic treatment reflecting said third wavelength.

Advantageously, the third optical power and the fourth optical power are zero.

Advantageously, the first holographic element is parallel to the second holographic element.

Advantageously, the form of the second holographic optical element is tailored so as to be integrated into an aircraft windscreen.

Advantageously, the angle at which the image of the first or the image of the second object is seen by the observer is around 20 degrees in a vertical axis.

Advantageously, the first distance is at infinity and the second distance is a few metres.

The invention also relates to the method for producing a first holographic optical element and a second holographic optical element as defined above, characterized in that at least one of the holographic treatments is produced by recording an interference phenomenon between two light waves coming from one and the same source, at least one of the two waves being plane.

Advantageously, at least one of the holographic treatments is produced by recording an interference phenomenon between two light waves coming from one and the same source, at least one of the two waves being spherical.

Advantageously, at least one of the holographic treatments is produced by recording an interference phenomenon between two light waves coming from one and the same source, at least one of the two waves being aspherical, the recording bench including at least one eccentric optical element positioned on the path of said aspherical wave.

Advantageously, at least one of the holographic treatments is produced by recording an interference phenomenon between two light waves coming from one and the same source, at least one of the two waves being aspherical, the recording bench including at least one digitally generated holographic optical element positioned on the path of said aspherical wave.

BRIEF DESCRIPTION OF THE DRAWINGS

The invention will be better understood and other advantages will become apparent on reading the following description, which is given by way of nonlimiting example, and by virtue of the appended figures in which.

DETAILED DESCRIPTION

Figure 1:
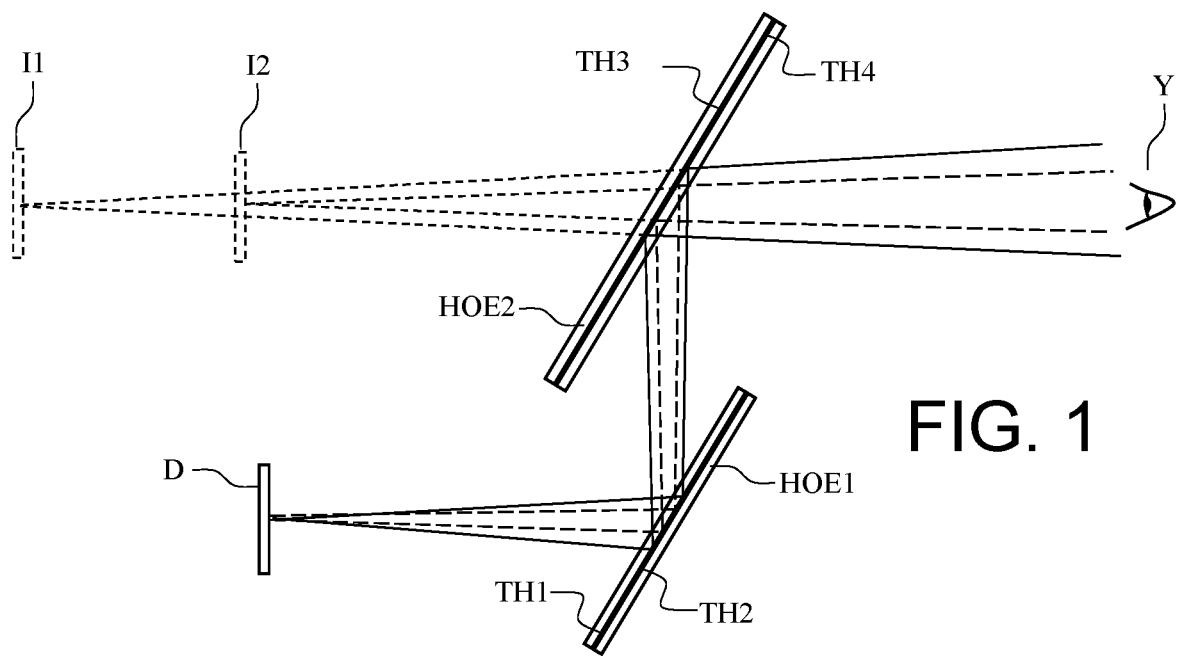
FIG. 1 shows an overview of a viewing system according to the invention.

FIG. 1 shows an overview of a viewing system according to the invention. It essentially comprises a viewing screen D and two holographic optical elements HOE1 and HOE2. The first holographic element HOE1 is closer to the screen D and the second holographic element HOE2 is closer to the eye Y of the observer. Light rays emitted at a first wavelength are shown by thin lines and light rays emitted at a second wavelength are shown by dashed lines in this FIG. 1.

The viewing screen D emits two objects. The first object is emitted at a first wavelength or in a narrow spectral band around said first wavelength, and the second object is emitted at a second wavelength or in a narrow spectral band around said second wavelength. The two spectral bands are separate. Each spectral band has a spectral width of between 10 nanometres and 20 nanometres.

The two wavelengths may be close enough for the colour sensations to be close. For example, the two wavelengths may be emitted in the 'green', that is to say in a spectral band of between 510 nm and 540 nm.

The two wavelengths may be far enough apart for the colour sensations to be different. For example, the first wavelength may be emitted in the 'green' as defined above and the second wavelength may be emitted in the 'red', that is to say in a spectral band of between 600 nm and 650 nm. Other choices of wavelength are possible. The choice of the wavelengths depends on the objects that are displayed and on how they are used.

By way of initial example, the viewing screen may be formed of a bispectral projector that projects the two emitted objects at different wavelengths onto a diffusive screen. The two objects may be obtained by way of matrix displays illuminated by light-emitting diodes or laser diodes. These displays may work by transmission. This is the case for example for liquid crystal displays or 'LCDs'. They may work by reflection. This is the case for example for what are termed 'DLP' displays, an acronym standing for 'digital light processing'.

By way of second example, the displays may be emissive, of 'OLED' (acronym for 'organic light-emitting diode') type or of micro-LED type.

It is also possible, if the display emits in a wide enough spectral band, to assign part of this band to a first object and another part to a second object using variable interference filters. French patent FR 3 028 051 entitled 'Stereoscopic viewing system with active wavelength multiplexing' describes a solution of this type.

It is also possible to project the two objects onto two different screens and then recombine them using a semi-reflective slide. The latter solution makes it possible to position the objects in identical or different planes.

The assembly of the two holographic elements forms, for each object, an aerial image at a different distance. Specifically, each holographic optical element has the particular feature that it includes two holographic treatments that are each tailored to one of the two above wavelengths and that have different optical powers.

Thus, the first holographic optical element HOE1 includes a first holographic treatment TH1 having a first optical power reflecting the first wavelength and transmitting the second wavelength. The first holographic optical element HOE1 includes a second holographic treatment TH2 having a second optical power reflecting the second wavelength and transmitting the first wavelength.

The second holographic optical element HOE2 includes a third holographic treatment TH3 having a third optical power reflecting the first wavelength and transmitting the second wavelength. The second holographic optical element HOE2 includes a fourth holographic treatment TH4 having a fourth optical power reflecting the second wavelength and transmitting the first wavelength. This second holographic element also has a second optical function. It has to transmit the external landscape without distortion and with an attenuation that is as low as possible.

In doing so, it is possible to create an optical power that is tailored to each object. The first object emitted at the first wavelength is focused at a first distance by the first holographic treatment TH1 and the third holographic treatment TH3. It corresponds to the image I1 in FIG. 1. The second object emitted at the second wavelength is focused at a second distance by the second holographic treatment TH2 and the fourth holographic treatment TH4. It corresponds to the image I2 in FIG. 1.

Generally, the first distance is at optical infinity and the second distance is at a finite distance. As has been stated, to achieve a certain visual comfort, it is important for this second distance to be greater than or equal to 1.7 metres from the observer. For the sake of clarity in terms of depiction, the first distance and the second distance are at a finite distance in FIG. 1.

It is not necessary for all of the holographic treatments to have optical power. By way of example, the third optical power and the fourth optical power may be zero. In this case, the second holographic element reflects only the images given by the first holographic element in a non-Cartesian manner, that is to say that the angle of reflection or of diffraction is not equal to the angle of incidence.

Figure 2:
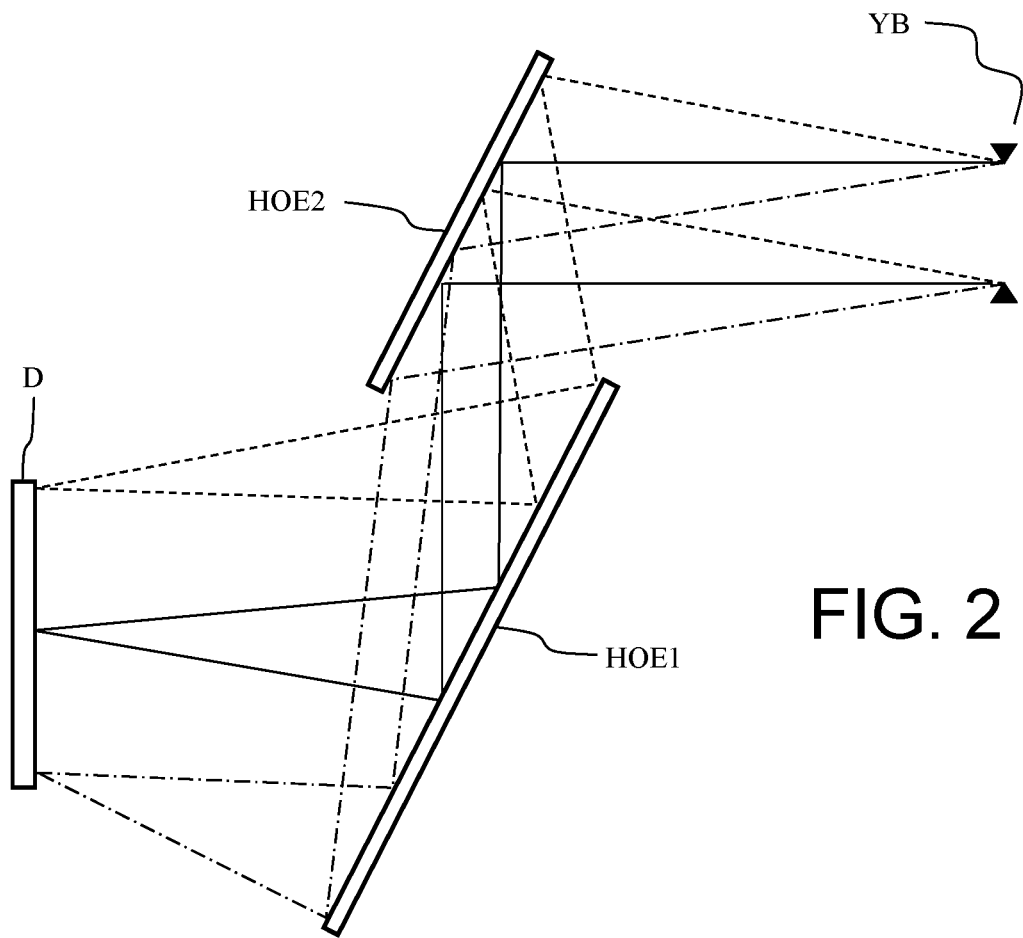
FIG. 2 shows the optical configuration of the viewing system according to the invention in the case of an image at infinity.

By way of nonlimiting exemplary embodiment, FIG. 2 shows a viewing system according to the invention. It includes a viewing screen D and two holographic optical elements HOE1 and HOE2. This system is intended to be installed in an aircraft cockpit, the second holographic optical element being intended to be integrated into the windscreen or 'windshield' of the aircraft. This system is intended to work at two wavelengths but, in FIG. 2, only the path of the light rays for a single wavelength is shown. By way of example, this wavelength is situated in the green, the emission spectral band being around 16 nm. The thin lines show the path of the light rays in the centre of the field for this wavelength, and the dashed lines show the path of the light rays for the two field edges for this same wavelength.

In the configuration of FIG. 2, the image from the screen is projected at infinity.

In FIG. 2 as well, the rectangles in thick lines show the viewing screen D and the holograms HOE1 and HOE2. The two black triangles define the limits of the 'eye box' YB of the viewing system. Eye box is understood to mean the zone where the eye of an observer is supposed to be situated in order to view the images correctly.

The screen has a height of around 270 mm. The image is obtained using the means outlined above and that are not shown in FIG. 2.

The two holographic optical elements are recorded on flat or substantially flat carriers. They are substantially parallel to one another. The width of the first holographic element HOE1 is 300 mm and its length is 500 mm. The width of the second holographic element HOE2 is 200 mm and its length is 300 mm.

The first holographic treatment of the first holographic optical element corresponds to an off-axis parabola. Its equivalent focal length is around 710 mm. The third holographic treatment of the second holographic optical element does not have optical power. It corresponds to a non-Cartesian mirror.

The height of the 'eye box' is around 100 mm and its width is around 200 mm. The vertical field of the projected image is around 20 degrees and the horizontal field is around 30 degrees. It corresponds approximately to that of current HUDs.

In this configuration, the optical aberrations and the chromatic aberrations remain acceptable for a viewing system. Optical aberrations are characterized essentially by parallax defects existing between the left-hand and right-hand images received by each eye. The distortion may be corrected at the displayed objects.

Producing holograms involves recording an interference phenomenon between two waves in a photosensitive material. Photopolymers are generally used as material. These materials have a very good resolution, compatible with the pitch of the interference fringes, allow high diffraction efficiencies to be achieved and exhibit little diffusion. The useful thickness of the material is between 16 µm and 25 µm, so as to achieve high diffraction efficiencies at the desired wavelength in a narrow spectral band.

The carrier of the holographic component may be glass or an organic glass such as polycarbonate. It should be noted that the carrier of the holographic component may be modified between recording and installation in the viewing system, either by machining, or by adhesive bonding, or by lamination and delamination.

As has been stated, each holographic component includes two holographic treatments. To produce the two treatments, several techniques are possible. It is possible to produce two holograms that are then adhesively bonded to one another. It is also possible to produce two recordings in the same substrate at two different wavelengths. The recordings are produced using a laser source the emission wavelength of which is generally identical or close to the replay wavelength.

It is possible to adjust the geometry of the recording bench so as to compensate for the differences in wavelength between the recording and the replay. Specifically, it is known that the pitch of the interference fringes depends on the wavelength but also on the incidence of the recording waves.

In the same way, the method for 'developing' the hologram between the recording and the replay may lead to an overall variation in the thickness of the photosensitive material, which phenomenon is called 'shrinkage'. This constriction of the pitch of the fringes may be compensated for in the recording by a suitable geometry of the bench.

Figure 3:
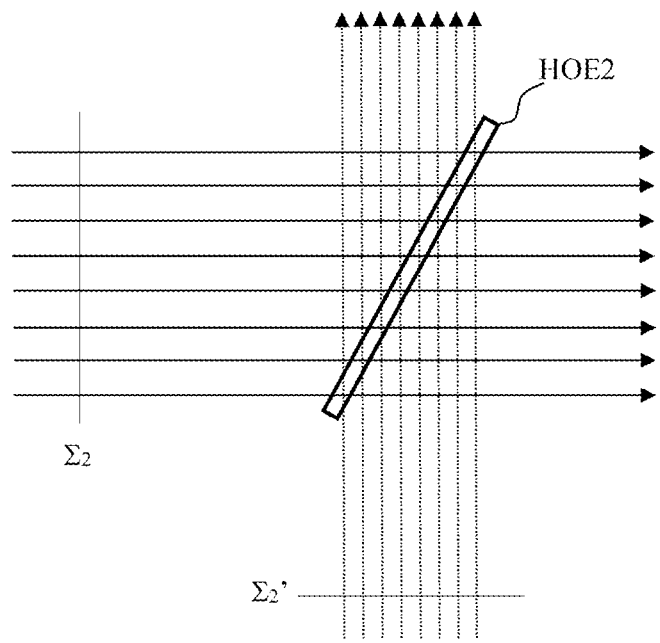
FIG. 3 shows a first recording bench for a first holographic optical element according to the invention.
Figure 4:
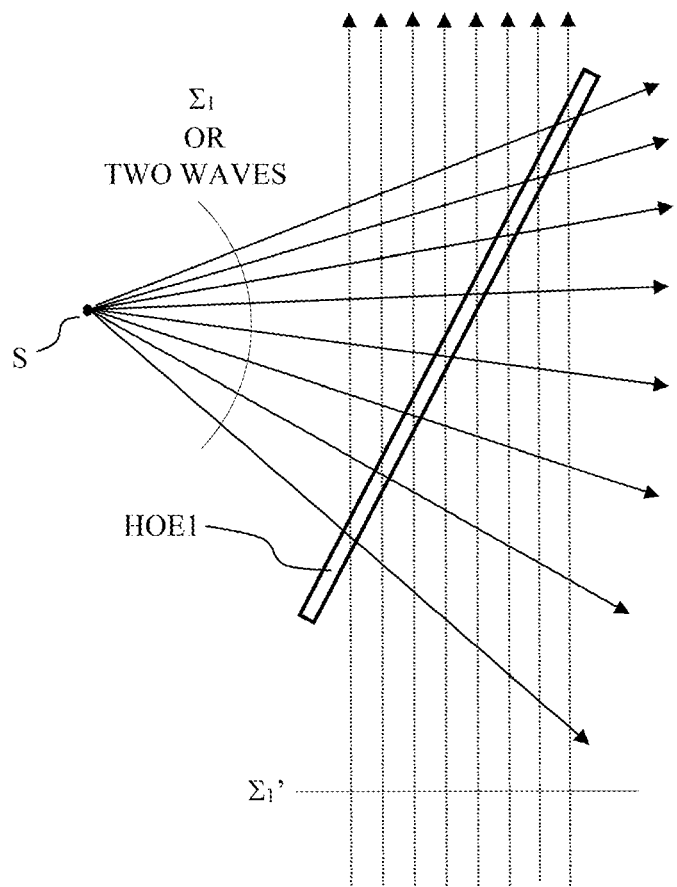
FIG. 4 shows a second recording bench for a second holographic optical element according to the invention.

By way of nonlimiting example, FIGS. 3 and 4 show two recording benches. In these figures, the light rays are shown by arrows and the wave surfaces are shown by thin lines. The first bench of FIG. 3 shows the recording of a holographic treatment of non-Cartesian mirror type HOE2. This mirror is obtained by recording two plane waves $\Sigma_2$ and $\Sigma_{2'}$ that are positioned on either side of the hologram. In this figure, the source and the collimation optics for producing the two plane waves are not shown.

The second bench of FIG. 4 shows the recording of a holographic treatment of off-axis parabolic mirror type HOE1. This mirror is obtained by recording a spherical wave $\Sigma_1$ coming from a source S and a plane wave $\Sigma_{1'}$ that are positioned on either side of the hologram. In this figure, the collimation optics for producing the plane wave are not shown. It should be noted that the spherical wave may be divergent, as indicated in FIG. 4, or it may be convergent. Convergent waves are more difficult to produce in so far as the recording bench has to have large optics.

It is possible to record wave surfaces that are more complex than a plane or a sphere. It is possible to produce simple aspherical wave surfaces by interposing, for example, prisms or mirrors on the path of one of the two recording waves. It is also possible to produce highly aspherized aspherical wave surfaces by interposing, for example, digitally created holograms called 'CGH', an acronym for 'computer-generated holograms'.

In the above, the viewing system according to the invention works with two different wavelengths and two different collimation distances. It is possible to multiply the wavelengths, for example in order to display two-colour or colour images. In this case, the first object and/or the second object includes three components, blue, green and red, and each holographic optical element includes three treatments tailored to each component.

It is also possible to multiply the collimation distances by multiplying the displayed objects.

However, each time a spectral band is used to form an image at a certain distance, the landscape is no longer transmitted by the second holographic optical element in this same spectral band, lowering the transmission of the viewing system by as much.

The invention claimed is:

1. A viewing system including a screen and an optical collimation device forming an image from this screen at a first distance from said screen, said optical collimation device including two holographic optical elements working by reflection, a first holographic optical element being closer to the screen, a second holographic optical element being closer to an observer, wherein:
   the screen displaying a first object at a first wavelength and a second object at a second wavelength, the first wavelength being different from the second wavelength;
   the first holographic optical element includes a first holographic treatment having a first optical power reflecting the first wavelength and transmitting the second wavelength;
   the first holographic optical element includes a second holographic treatment having a second optical power reflecting the second wavelength and transmitting the first wavelength;
   the second holographic optical element includes a third holographic treatment having a third optical power reflecting the first wavelength and transmitting the second wavelength;
   the second holographic optical element includes a fourth holographic treatment having a fourth optical power reflecting the second wavelength and transmitting the first wavelength; and
   the first holographic optical element and the second holographic optical element being arranged such that the image of the first object at the first wavelength forms at the first distance from the screen and that the image of the second object at the second wavelength forms at a second distance from the screen, substantially different from the first distance.

2. The viewing system according to claim 1, wherein the first object is emitted in a first narrow spectral band centred on the first wavelength, the second object is emitted in a second narrow spectral band centred on the second wavelength, the first spectral band being separate from the second narrow spectral band, each band having a spectral width of between 10 nanometres and 20 nanometres.

3. The viewing system according to claim 1, wherein the first wavelength and the second wavelength have different colorimetries.

4. The viewing system according to claim 1, wherein the first wavelength is situated in the green and the second wavelength in the red.

5. The viewing system according to claim 1, wherein the third optical power and the fourth optical power are zero.

6. The viewing system according to claim 1, wherein the first optical holographic element is parallel to the second holographic optical element.

7. The viewing system according to claim 1, wherein the second holographic optical element is integrated into an aircraft windscreen.

8. The viewing system according to claim 1, wherein an angle at which the image of the first object or the image of the second object is seen by the observer is around 20 degrees in a vertical axis.

9. The viewing system according to claim 1, wherein the first distance is at infinity and the second distance is a finite distance.

10. The viewing system according to claim 9, wherein the finite distance is greater than or equal to 1.7 metres.

11. A method for producing a viewing system according to claim 1, wherein at least one holographic treatment is produced by recording an interference phenomenon between two light waves coming from one and a same source, at least one of the two light waves being plane.

12. A method for producing a viewing system according to claim 1, wherein at least one of the holographic treatments is produced by recording an interference phenomenon between two light waves coming from one and a same source, at least one of the two light waves being spherical.

13. A method for producing a viewing system according to claim 1, wherein at least one of the holographic treatments is produced by recording an interference phenomenon between two light waves coming from one and a same source, at least one of the two light waves being aspherical, a recording bench including at least one eccentric optical element positioned on a path of said aspherical wave.

14. A method for producing a viewing system according to claim 1, wherein at least one of the holographic treatments is produced by recording an interference phenomenon between two light waves coming from one and a same source, at least one of the two light waves being aspherical, a recording bench including at least one digitally generated holographic optical element positioned on a path of said aspherical wave.

* * * * *

UNITED STATES PATENT AND TRADEMARK OFFICE
CERTIFICATE OF CORRECTION

PATENT NO.         : 11,061,370 B2                                    Page 1 of 1
APPLICATION NO.    : 16/047785
DATED              : July 13, 2021
INVENTOR(S)        : Philippe Coni et al.

It is certified that error appears in the above-identified patent and that said Letters Patent is hereby corrected as shown below:

In the Claims

In Claim 4, Column 8, Line 58, "situated in the green and the second wavelength in the red" should be -- situated in green and the second wavelength in red --.

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*